124,245

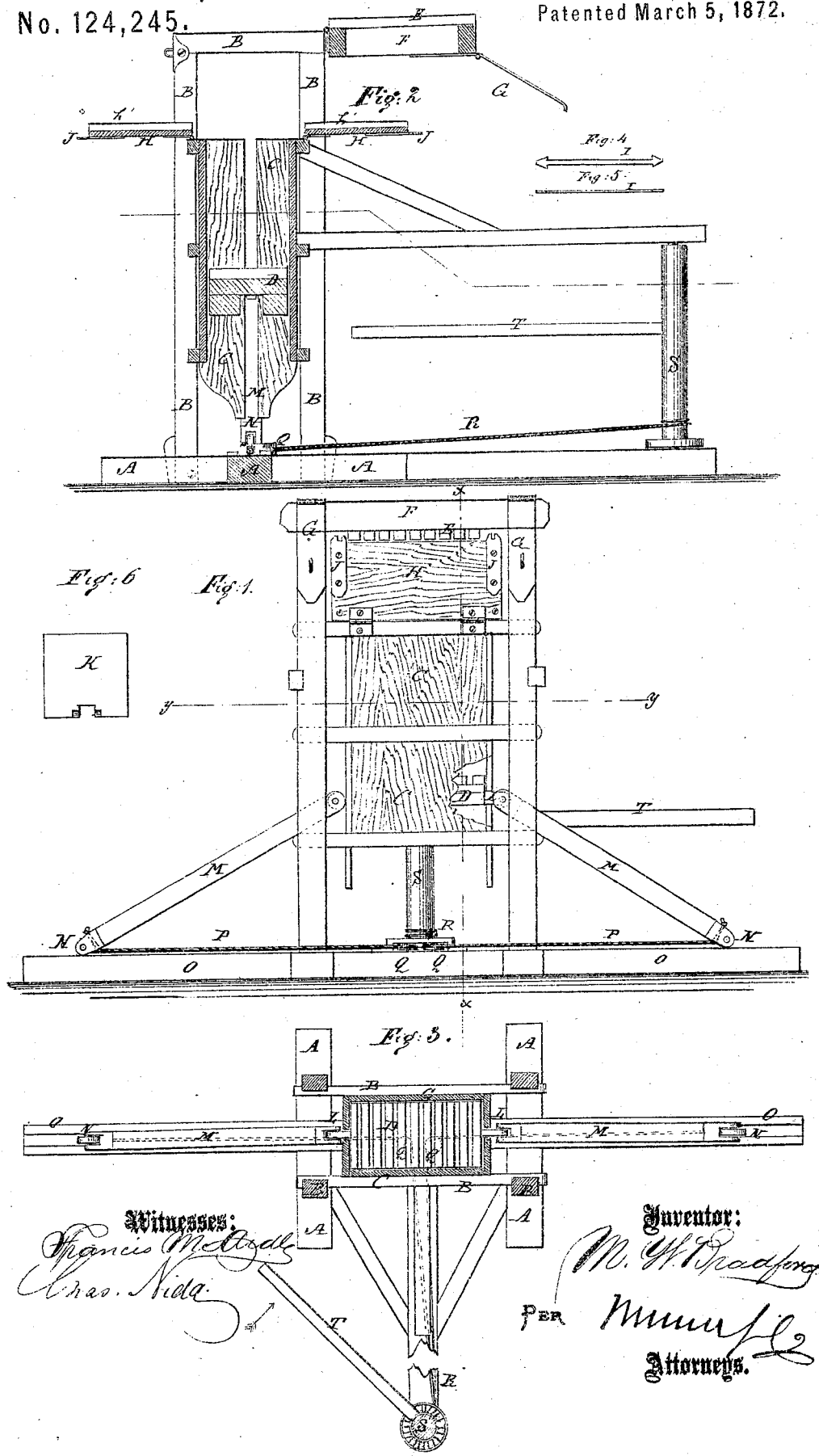

UNITED STATES PATENT OFFICE.

MALIKIAH W. BRADFORD, OF GREENWOOD, LOUISIANA.

IMPROVEMENT IN COTTON-PRESSES.

Specification forming part of Letters Patent No. 124,245, dated March 5, 1872.

Specification describing certain Improvements in "Cotton-Presses," invented by MALIKIAH W. BRADFORD, of Greenwood, in the parish of Caddo and State of Louisiana.

Figure 1 is a front view of my improved press, part being broken away to show the construction. Fig. 2 is a vertical detail sectional view of the same taken through the line $x\,x$, Fig. 1. Fig. 3 is a detail horizontal section of the same taken through the line $yy$, Fig. 1. Figs. 4 and 5 are detail views of the locking-bar for locking the baling-box. Fig. 6 is a detail view of one of the ends of the baling-box.

Similar letters of reference indicate corresponding parts.

My invention has for its object to furnish an improved press for pressing and baling cotton and other materials, which shall be simple in construction, convenient in use, and effective in operation, acting with increased power as the bale becomes more and more compressed; and it consists in the construction and combination of various parts of the press, as hereinafter more fully described.

A represents the base-frame of the press, to which are securely attached the lower ends of the posts of the upright frame B, which is made of such a size as to receive and support the receiving-box C, into which the follow-block D fits, and through which it moves up and down. E is the head-block, against which the bale is pressed, and which is attached to a frame, F. The frame F is hinged, at one side edge, to one side of the top of the frame B; and to its top, at its other side edge, are hinged hasps G, which overlap the outer side of the frame B, and are slotted to receive staples attached to said frame B. The hinges and hasps of the top frame F must be made sufficiently strong to resist the strain in compressing the bale. H are the sides of the baling-box, which fill the space between the receiving-box C and the top frame F, and the lower edges of which are hinged to cross-bars of the frame B. The upper edges of the sides H are held in position and supported against the outward pressure by the lock-bars I, which have a head formed upon each end, and which are dropped into forks or slotted bars J attached to the outer sides of the said sides H, and which project above the upper edges of the said sides to receive the said lock-bars I. The ends K of the baling-box fit between the end parts of the sides H, and are supported against the outward pressure by cleats $h'$ attached to the inner sides of the ends of the said sides H. To the ends of the follow-block D are attached lugs L, which project through the slotted ends of the receiving-box C, and to which are pivoted the upper ends of the bars M, to the lower ends of which are pivoted small wheels N, which roll back and forth in grooves in the beams O, the inner ends of which are connected with the base-frame A. The bottoms of the grooves in the beams O are faced with metal plates to prevent wear. To the outer or lower ends of the bars M are attached the outer ends of two ropes or chains, P, which pass around guide-pulleys Q, pivoted to the base-frame A of the press, or to a pulley-block attached to said base-frame. A little beyond the pulleys Q the ends of the two ropes or chains P are attached to the end of a single rope or chain, R, which passes outward, and its other end is attached to a vertical shaft or drum, S, the upper and lower ends of which are pivoted to beams attached to and projecting outward from the frame-work A B of the press, or are pivoted to other suitable supports. To the shaft or drum S is attached one or more sweeps, T, for turning the said shaft. The shaft S should be provided with a pawl-and-ratchet wheel to hold it securely in any position into which it may be revolved.

By this construction, by turning the shaft or drum S in one direction the rope or chain R will be wound around it, drawing the outer ends of the bars M inward, which forces the follow-block D upward, compressing the bale. The bars M act as toggle-joints, forcing the follow-block D upward with a slower motion and increased power as the bale becomes more and more compressed.

Having thus described my invention, I claim as new and desire to secure by Letters Patent—

1. The arrangement of the hinged sides H h', detachable ends K, lock-bars I, and forked or slotted bars J, with respect to each other, and the box C, frame A, and top frame F, to which the head-block E is attached, substantially as herein shown and described.

2. The arrangement of the top frame F with its hinges and hasps, in connection with the head-block E, frame B, and receiving-box composed of sides H and ends K, substantially as herein shown and described, and for the purpose set forth.

MALIKIAH W. BRADFORD.

Witnesses:
B. F. WIGGIN,
V. SHIRDET.